United States Patent
Nun et al.

(10) Patent No.: US 7,517,487 B2
(45) Date of Patent: Apr. 14, 2009

(54) RELEASE AGENTS COMPRISING HYDROPHOBIC, NANOSCALAR PARTICLES, AND THE USE OF THESE MOLD RELEASE AGENTS

(75) Inventors: Edwin Nun, Billerbeck (DE); Markus Oles, Hattingen (DE)

(73) Assignee: Degussa AG, Düsseldorf (DE)

( * ) Notice: Subject to any disclaimer, the term of this patent is extended or adjusted under 35 U.S.C. 154(b) by 812 days.

(21) Appl. No.: 10/506,995

(22) PCT Filed: Feb. 3, 2003

(86) PCT No.: PCT/EP03/01025

§ 371 (c)(1),
(2), (4) Date: Sep. 9, 2004

(87) PCT Pub. No.: WO03/076157

PCT Pub. Date: Sep. 18, 2003

(65) Prior Publication Data

US 2005/0253302 A1 Nov. 17, 2005

(30) Foreign Application Priority Data

Mar. 12, 2002 (DE) ............................... 102 10 671

(51) Int. Cl.
*B29C 45/40* (2006.01)
*B29C 49/70* (2006.01)
*B29C 51/44* (2006.01)

(52) U.S. Cl. ........................ 264/338; 264/553; 264/523; 264/328.1

(58) Field of Classification Search ........................ None
See application file for complete search history.

(56) References Cited

U.S. PATENT DOCUMENTS 4,131,662 A 12/1978 Cekoric et al.

(Continued)

FOREIGN PATENT DOCUMENTS

EP 0 457 554 11/1991

(Continued)

OTHER PUBLICATIONS

U.S. Appl. No. 12/159,103, filed Jun. 25, 2008, Nun, et al.

(Continued)

*Primary Examiner*—Edmund H. Lee
(74) *Attorney, Agent, or Firm*—Oblon, Spivak, McClelland, Maier & Neustadt, P.C.

(57) ABSTRACT

The invention relates to mold-release agents, in particular mold-release agents which can be used for demolding moldings from molding tools, and also to the use of these mold-release agents.

The mold-release agents of the invention, which are preferably based on suspensions of nanostructured microparticles, have the advantage of being markedly more environmentally compatible than the known mold-release agents based on organic or organosilicon compounds, since they can remain on the surfaces of the moldings. The use of the mold-release agents of the invention is very simple, since advantage can be taken of existing equipment. An example of a usual method is to produce injection moldings by means of injection molds into which the material is injected. The mold-release agent of the invention is applied, e.g. by spray-application, to the injection mold prior to the actual injection-molding process.

Depending on the setting of the molding parameters, the microparticles are impressed into the surfaces of the moldings and anchored, and therefore another favorable effect is that the surfaces of the injection molding can have self-cleaning properties.

14 Claims, 1 Drawing Sheet

U.S. PATENT DOCUMENTS

| | | |
|---|---|---|
| 6,420,091 B1 * | 7/2002 | Nakayama et al. .......... 430/302 |
| 6,811,856 B2 | 11/2004 | Nun et al. |
| 6,852,389 B2 | 2/2005 | Nun et al. |
| 6,858,284 B2 | 2/2005 | Nun et al. |
| 6,977,094 B2 | 12/2005 | Oles et al. |
| 7,083,828 B2 | 8/2006 | Muller et al. |
| 7,235,298 B2 | 6/2007 | Katusic et al. |
| 7,374,743 B2 | 5/2008 | Katusic et al. |
| 2002/0148601 A1 | 10/2002 | Roos et al. |
| 2002/0164443 A1 | 11/2002 | Oles et al. |
| 2003/0013795 A1 | 1/2003 | Nun et al. |
| 2003/0134086 A1 | 7/2003 | Nun et al. |
| 2003/0147932 A1 | 8/2003 | Nun et al. |
| 2004/0154106 A1 | 8/2004 | Oles et al. |
| 2005/0084653 A1 | 4/2005 | Nun et al. |
| 2005/0112326 A1 | 5/2005 | Nun et al. |
| 2005/0118433 A1 | 6/2005 | Oles et al. |
| 2005/0118911 A1 | 6/2005 | Oles et al. |
| 2005/0253302 A1 | 11/2005 | Nun et al. |
| 2006/0049376 A1 | 3/2006 | Nun et al. |
| 2006/0235143 A1 | 10/2006 | Muller et al. |
| 2007/0254178 A1 | 11/2007 | Nun |
| 2008/0084686 A1 | 4/2008 | Gutsch et al. |
| 2008/0206174 A1 | 8/2008 | Bergandt et al. |

FOREIGN PATENT DOCUMENTS

| | | |
|---|---|---|
| EP | 0 517 155 | 12/1992 |
| JP | 9-110414 * | 4/1997 |
| JP | 2000-128577 * | 5/2000 |
| WO | 96 04123 | 2/1996 |

OTHER PUBLICATIONS

U.S. Appl. No. 12/037,431, filed Feb. 26, 2008, Bergandt, et al.
U.S. Appl. No. 10/526,559, filed Mar. 4, 2005, Nun, et al.
U.S. Appl. No. 10/546,979, filed Aug. 26, 2005, Nun, et al.
U.S. Appl. No. 10/551,841, filed Oct. 3, 2005, Nun, et al.
U.S. Appl. No. 11/321,285, filed Dec. 21, 2005, Oles, et al.
U.S. Appl. No. 11/312,557, filed Dec. 21, 2005, Oles, et al.
U.S. Appl. No. 10/556,092, filed Nov. 9, 2005, Oles, et al.
U.S. Appl. No. 11/312,469, filed Dec. 21, 2005, Nun, et al.

* cited by examiner

RELEASE AGENTS COMPRISING HYDROPHOBIC, NANOSCALAR PARTICLES, AND THE USE OF THESE MOLD RELEASE AGENTS

CROSS-REFERENCE TO RELATED APPLICATIONS

The present application is a 35 U.S.C. § 371 National Stage patent application of International patent application PCT/EP03/01025, filed on Feb. 3, 2003, which claims priority to German patent application DE 10210671.1, filed on Mar. 12, 2002.

FIELD OF THE INVENTION

The present invention relates to the use of hydrophobic nanoparticles as mold-release agents or release agents in molding processes, for the accelerated demolding of moldings from the molding tools, and also to the mold-release agents themselves. Furthermore, moldings which have surfaces with self-cleaning properties are obtained by means of the mold-release agents of the invention.

DISCUSSION OF THE BACKGROUND

The patent literature describes numerous processes and agents intended for the demolding of polymeric injection moldings. These descriptions extend from the spraying of the inner sides of the injection mold with lubricants, such as oils, fats, talc, waxes or silicone oils, to addition of lubricants to the polymer, where these simultaneously serve as an aid to demolding. Both these processes, the spraying of the inner surfaces of the injection molds with oily chemicals and procedures of admixture to the bulk material, have serious disadvantages. The introduction of a spray onto the inner walls of the injection mold generally brings about good demoldability, but has the disadvantage that there are oily, liquid substances located on the surfaces of the injection moldings after demolding. Prior to use or further processing of the injection moldings, therefore, the demolding auxiliary very generally has to be removed, e.g. by means of a solvent. Considerable process resources and costs are required for separation of solvent and demolding auxiliary, e.g. by distillation, and then to permit recycling of the substances in order to minimize pollution of the environment.

A still greater disadvantage is present when lubricants or mold-release agents are added to the actual polymer used for the injection-molding process. Frequently, no effects are measurable unless more than 0.1% by weight of mold-release agents is added, based on the total weight of the polymer. This addition results in very high costs for the starting materials. Additions of this order of magnitude moreover often alter the properties of the polymer materials, e.g. tensile strength, melting point, etc., and this can imply additional alterations or modifications to the mixing specification.

The use of inorganic particles, in particular silicas, as antiblocking or anticaking agents during the production of polymer films has been known for some time (Technical Bulletin Pigments No. 13: Synthetic Silicas as Auxiliaries for the Plastics Industry, 5$^{th}$ edition, Degussa A G, August 1992). In these applications, a silica powder, e.g. Aerosil R 972 or Sipernat 44, is either incorporated into the polymer prior to its processing or mixed with polymer pellets before these pellets are processed, e.g. by blow molding, injection molding, or extrusion. Polymer films produced in this way do not block, for example when they are wound up. These uses of silicas probably also affect the demolding properties of the polymers used to some extent, but the use of the silicas as additives is relatively complicated, since the polymers or polymer pellets have to be mixed with the silica prior to the actual molding process.

SUMMARY OF THE INVENTION

An object of the present invention was therefore to provide mold-release agents which avoid the disadvantages of the mold-release agents known to date, in particular the change in the properties of the polymer materials on addition of the mold-release agent to the polymers, and the complicated recycling of mold-release agents.

Surprisingly, it has been found that hydrophobic microparticles are suitable as mold-release agents and can avoid the disadvantages mentioned which arise during use of the mold-release agents known hitherto, based on organic or organosilicon compounds.

The present invention therefore provides a mold-release agent for demolding moldings from molding tools during molding processes, where the mold-release agent is not mixed with the polymeric material used to produce these moldings, wherein the mold-release agent comprises microparticles with a size of from 0.02 to 100 μm, and the use of these microparticles as mold-release agents.

The present invention also provides a process for producing moldings by the molding of molding compositions comprising polymeric compounds, using a mold-release agent of the invention, wherein the mold-release agent is applied to, in particular sprayed onto a molding tool prior to a molding step, and then a molding step is carried out in which the microparticles from the molding tool are impressed into a surface of the molding produced. In the case of some polymers, it is possible to obtain a surface with extremely low water-wettability via appropriate choice of the process parameters, by securing the particles within the surface of the polymer. This surface can have self-cleaning properties.

An advantage of the mold-release agents of the invention is that they are based on materials with relatively good environmental compatibility. In particular, the use of microparticles based on inorganic substances, e.g. fumed silica, is not attended by any environmental problems.

Another advantage of the mold-release agent of the invention is that it can be used in conventional processes for the production of moldings, in particular of injection moldings. Moldings are usually produced by using molds to mold the molding composition. The mold-release agent of the invention is preferably applied to the molding tool or mold prior to the actual molding process. This simple method makes the moldings/injection moldings easy to remove from the molding tool or injection mold. If during the molding process the microparticles of the mold-release agent are secured to or within the surface, these may also have self-cleaning properties. A very particularly advantageous feature of this type of use of the mold-release agent is that there is no need for a complicated step to incorporate the mold-release agent into the material used in the molding process, or to mix it into pellets, where pellets are used.

In addition to easy demoldability, even of complicated moldings, moldings which are demolded using hydrophobic nanoscale microparticles as mold-release agents and in which the microparticles have been secured to or within the surface also have self-cleaning surfaces, known as lotus-effect surfaces. Surfaces of this type were first described by A. A. Abramson in Chimia i Shisn Russ. 11, 38, but without any recognition that hydrophobic structured surfaces can also be self-cleaning. This was recognized and described (WO 96/04123, U.S. Pat. No. 3,354,022) only subsequently by Prof. Barthlott. According to that publication, if a surface is to have good self-cleaning properties, it has not only to be hydrophobic but also to have some degree of roughness. A suitable combination of structure and hydrophobic properties makes it possible for even small amounts of water moving on the surface to entrain adherent dirt particles and clean the surface.

The prior art in relation to self-cleaning surfaces, as in EP 0 933 388, is that these self-cleaning surfaces have to have an aspect ratio greater than 1 and surface energy smaller than 20 mN/m. The aspect ratio is defined here as the quotient obtained by dividing the average height of the structure by its average width. The abovementioned criteria are to be found in the natural world, for example in the lotus leaf. The surface of the plant, formed from a hydrophobic waxy material, has elevations separated from one another by a few μm. Water droplets essentially contact only these peaks. There are many descriptions in the literature of water-repellent surfaces of this type, an example being an article in Langmuir 2000, 16, 5754, by Masashi Miwa et al., according to which contact angle increase and roll-off angle decrease with an increase in the degree of structuring of artificial surfaces formed from boehmite, applied to a spin-coated layer and then calcined.

DE 101 18 348 describes polymer fibers with self-cleaning surfaces in which the self-cleaning surface is obtained through the action of a solvent which comprises structure-forming particles, solvation of the surface of the polymer fibers by the solvent, adhesion of these structure-forming particles to the solvated surface, and removal of the solvent. The disadvantage of this process is that when the polymer fibers are processed (spinning, knitting, etc.) the structure-forming particles, and therefore the structure which makes the surface self-cleaning, can become damaged or under certain circumstances even be entirely lost, with the result that the self-cleaning effect is likewise lost. However, there is no description in that publication of microparticles used as mold-release agents.

DETAILED DESCRIPTION OF THE INVENTION

The invention is described below by way of example, but is not limited to these embodiments.

The mold-release agent of the invention for demolding moldings from molding tools during molding processes, where the mold-release agent is not mixed, prior to the molding process with the polymeric material used to produce these moldings, comprises microparticles whose size is from 0.02 to 100 μm. The use of these microparticles as mold-release agent has the abovementioned advantages. The mold-release agent preferably comprises microparticles with an average size of from 0.02 to 100 μm, particularly preferably from 0.1 to 50 μm, and very particularly preferably from 0.1 to 30 μm. However, suitable microparticles may also have a size smaller than 500 nm, or be formed by combining primary particles to give agglomerates or aggregates with a size of from 0.2 to 100 μm.

It can be advantageous for the microparticles to have hydrophilic or hydrophobic, preferably hydrophobic, properties. These hydrophobic properties may be attributable to the properties of the actual materials present on the surfaces of the particles, or else may be obtained via treatment of the particles with a suitable compound. Examples of methods of hydrophobicizing the particles are treatment with a compound from the group consisting of the alkylsilanes, the fluoroalkylsilanes, and the disilazanes, or with similar organosilicon compounds. Examples of typical representatives of these compounds are marketed by Degussa with the tradenames Dynasylan®.

The mold-release agent typically comprises microparticles selected from silicates, minerals, metal oxides, metal powders, silicas, pigments, and polymers, very particularly preferably from fumed silicas, precipitated silicas, aluminum oxide, silicon oxide, doped silicates, titanium dioxides, and pulverulent polymers.

Figure 1:
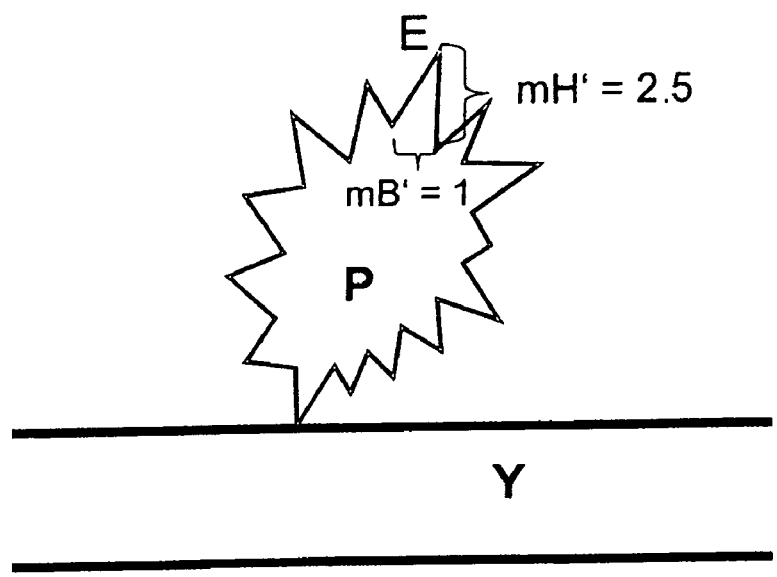
FIG. 1 illustrates a microparticle associated with the surface of a molding.

Microparticles particularly suitable for the mold-release agents of the invention are those whose surface has an irregular nanostructure. These microparticles with the irregular fine structure preferably have elevations with an aspect ratio greater than 1, particularly preferably greater than 1.5. The aspect ratio is defined here as the quotient obtained by dividing the maximum height of the elevation by its maximum width. FIG. 1 illustrates diagrammatically this particle shape. The figure shows the surface of a molding Y, on which there is a particle P of the mold-release agent. A selected elevation of the elevations E present on the particles due to the fine structure of the particles has an aspect ratio of 2.5, calculated as a quotient obtained by dividing the maximum height of the elevation mH', which is 2.5, by the maximum width mB', which in turn is 1.

Preferred microparticles whose surface has an irregular nanostructure are particles which comprise at least one compound selected from fumed silica, precipitated silicas, aluminum oxide, silicon dioxide, titanium dioxides, doped silicates, and pulverulent polymers, e.g. spray-dyed and agglomerated emulsions or cryogenically milled PTFE. Particularly suitable particle systems are hydrophobicized fumed silicas, known as Aerosils®. For better demolding, hydrophobic properties are needed alongside the structure. The hydrophobic particles used may themselves be hydrophobic, e.g. pulverulent polytetrafluoroethylene (PTFE). The microparticles may have been provided with hydrophobic properties, examples being Aerosil VPR 411 and Aerosil R 8200. However, they may also be hydrophobicized subsequently. Examples of these particles to be hydrophobicized are Aeroperl 90/30®, Sipernat Kieselsäure 350®, Aluminiumoxid C®, zirconium silicate, vanadium-doped or VP Aeroperl P 25/20®. For the latter, the particle is advantageously hydrophobicized through treatment with perfluoroalkylsilane compounds followed by heat-treatment.

The mold-release agent of the invention may be a powder or be in suspension in a liquid. The mold-release agent preferably comprises the microparticles suspended in a liquid, preferably in a volatile solvent. The solvents present in the suspensions are preferably an alcohol, in particular ethanol or isopropanol, ketones, e.g. acetone or methyl ethyl ketone, ethers, e.g. diisopropyl ether, or else hydrocarbons, such as cyclohexane. The suspensions very particularly preferably comprise alcohols. It can be advantageous for the suspension to comprise from 0.1 to 10% by weight, preferably from 0.25 to 7.5% by weight, and very particularly preferably from 0.5 to 5% by weight, of microparticles, based on the total weight of the suspension.

The mold-release agent is particularly suitable as a mold-release agent or release agent for demolding moldings from molds, where these have been produced by a thermal molding process selected from blow molding, extrusion blow molding, extrusion stretch blow molding, injection blow molding, injection stretch blow molding, thermoforming, vacuum stretch forming, pressure stretch forming, injection molding, and rotary thermoforming. The mold-release agent of the invention is very particularly preferably used for the demolding of tires, in particular car tires, motorcycle or pedal cycle tires, bus tires, aircraft tires, industrial tires, or truck tires, or else tires for agriculture or for the construction industry, from the molds of the tire presses which are used during vulcanization and profiling of the tire treads.

The mold-release agent of the invention is preferably used in the process of the invention for producing moldings by a molding process. This process for producing moldings by a molding process from molding compositions comprising polymeric compounds with use of a mold-release agent of the invention applies the mold-release agent to a molding tool, prior to a molding step, and then carries out the molding step. If the mold-release agent of the invention is a suspension it can be advantageous for the molding step not to be carried out until the liquid content of the suspension has been evaporated.

The molding tool is preferably a mold which conventionally is, or can be, used for producing conventional moldings in the respective molding process.

Examples of the molding process are a thermal molding process selected from blow molding, extrusion blow molding, extrusion stretch blow molding, injection blow molding, injection stretch blow molding, thermoforming, vacuum stretch forming, pressure stretch forming, injection molding, and rotary thermoforming, these being processes in which a mold is used to mold a molding composition. In addition to the use of the mold-release agent of the invention in these molding processes, the mold-release agent may also be used in molding processes such as those selected from calendering, extrusion, and sheet extrusion. The molding tools used in these processes are rollers which in particular determine the thickness of the moldings.

The mold-release agent is preferably applied to the inner surfaces of the injection mold, thermoforming mold, or blow mold during injection molding, thermoforming, or blow molding, or to the surface of a calender roll or molding roll during calendering, extrusion, or sheet extrusion. Particularly preferred molding processes are injection molding, calendering, sheet extrusion, and blow molding, since in these processes the mold-release agent can easily be applied to the molding tools, e.g. the rolls, or to the molds.

The mold-release agent may be applied to the substrate by spraying or scattering. An example of a method for spraying the release agent comprising microparticles onto the molding tool is the spraying of dispersions or aerosols comprising microparticle powders and, besides the microparticles, comprising a propellant for a, preferably volatile, solvent. The solvent present in the suspensions used is preferably an alcohol, in particular ethanol or isopropanol, ketones, e.g. acetone or methyl ethyl ketone, ethers, e.g. diisopropyl ether, or else hydrocarbons, such as cyclohexane. The suspensions very particularly preferably comprise alcohols. It can be advantageous for the suspension to comprise from 0.1 to 10% by weight, preferably from 0.25 to 7.5% by weight, and very particularly preferably from 0.5 to 5% by weight, of microparticles, based on the total weight of the suspension.

In particular in the case of spray-application of a dispersion, it can be advantageous for the mold surface temperature of the injection mold to be from 30 to 150° C. However, depending on the injection molding to be produced or on the material used for the same, it is also possible for the temperature of the mold to be within the range mentioned irrespective of the microparticles and of the manner of application of the microparticles.

In one particular embodiment of the process of the invention, the mold-release agent is applied to a molding tool prior to a molding step, and then a molding step is carried out in which the microparticles from the molding tool are impressed into the resultant molding, into one of its surfaces which has not yet solidified. This method not only ensures demolding but also gives moldings with surfaces which have elevations and, if the hydrophobic properties of these surfaces are at a sufficiently high level, as self-cleaning properties. The manner of impressing the microparticles here is preferably such that the extent to which at least some, preferably at least 50%, of the particles are impressed into the surface of the molding is only a maximum of 90% of their diameter, preferably from 10 to 70%, with preference from 20 to 50%, and very particularly preferably from 30 to 40%, of their average diameter.

The material used for any of the embodiments of the process of the invention may be any of the polymers suitable for the various molding processes. Preferred materials used for the molding processes are polymers or polymer blends which comprise a polymer based on polycarbonates, on poly(meth)acrylates, on polyamides, on polyvinyl chloride, on polyethylenes, on polypropylenes, on aliphatic linear or branched polyalkenes, on cyclic polyalkenes, polystyrenes, on polyesters, on polyether sulfones, on polyacrylonitrile, or on polyalkylene terephthalates, on poly(vinylydene fluoride), on poly(hexafluoropropylene), on polyoxymethylenes, on acrylonitrile-butadiene-styrene terpolymers (ABS), on polyisoprene, on polychloroisoprene, on synthetic or natural rubber, on poly(perfluoropropylene oxide), on poly(fluoroalkyl acrylate), on poly(fluoroalkyl methacrylate), on poly(vinyl perfluoroalkyl ether), or on other polymers selected from perfluoroalkoxy compounds, poly(isobutene), poly(4-methyl-1-pentene), polynorbornene in the form of homo- or copolymer, and mixtures of these.

If the molding process is injection molding, preferred materials are polymers which comprise a polymer based on polycarbonates, on poly(meth)acrylates, on polyamides, on polyvinyl chloride, on polyethylenes, on polypropylenes, on aliphatic linear or branched polyalkenes, on cyclic polyalkenes, on polystyrenes, on polyesters, on polyether sulfones, on polyacrylonitrile, or on polyalkylene terephthalates, on poly(vinylidene fluoride), on poly(hexafluoropropylene), on poly(perfluoropropylene oxide), on poly(fluoroalkyl acrylate), on polyoxymethylenes, on ABS, on poly(fluoroalkyl methacrylate), on poly(vinyl perfluoroalkyl ether), or on other polymers selected from perfluoroalkoxy compounds, poly(isobutene), poly(4-methyl-1-pentene), polynorbornene in the form of homo- or copolymer, and mixtures of these.

If the molding process is sheet extrusion, preferred materials are polymers which comprise a polymer based on polycarbonates, on poly(meth)acrylates, on polyamides, on polyvinyl chloride, on polyethylenes, on polypropylenes, on aliphatic linear or branched polyalkenes, on cyclic polyalkenes, on polystyrenes, on polyesters, on polyacrylonitrile, on poly(vinylidene fluoride), or on other polymers selected from polyoxymethylenes, polychloroisoprene, poly(isobutene), and ABS in the form of homo- or copolymer, and mixtures of these.

If the molding process is blow molding, preferred materials are polymers which comprise a polymer based on polycarbonates, on polyamides, on polyvinyl chloride, on polyethylenes, on polypropylenes, on aliphatic linear or branched polyalkenes, on cyclic polyalkenes, on polystyrenes, on polyesters, or on ABS, in the form of homo- or copolymer, or on a mixture of these.

If the molding process is calendering, preferred materials are polymers which comprise a polymer based on polyvinyl chloride, acrylonitrile-butadiene-styrene terpolymer, or synthetic or natural rubber.

If the molding process is vulcanization with simultaneous molding, e.g. as used in tire production, preferred materials are polymers based on vulcanized rubber or on unvulcanized natural or synthetic rubber. During tire production, a tire preform is usually vulcanized in a tire press, the result being strengthening of the bonding in the tire preform and creation of the tire-tread profile. Depending on the embodiment, the tire presses have two or more molds representing a negative of the tire tread. Depending on the nature of the tire to be produced, the tire preform is pressed into the mold or molds, or the mold or molds is/are pressed into the tire preform. This mold is designed to be heatable in order to permit vulcanization to proceed. According to the invention, the mold-release agent of the invention is applied to the molds during tire production, prior to the actual molding and vulcanization process. It is certainly possible that in this process there is some anchoring of the mold-release agent within the surface of the tire tread. In our studies, no long-term impairment of rolling properties was observed, since the mold-release agent had been removed after just a few meters of running. No further details of the tire production process will be given here. Further information on this topic can be found under the keyword Rubber in Ullmanns Enzyklopädie der technischen Chemie [Ullmann's Encyclopedia of Industrial Chemistry], $4^{th}$ edition, Volume 13, Verlag Chemie GmbH Weinheim, 1977, for example.

The molding compositions used during the molding process may also comprise, alongside the polymeric materials, fillers and/or pigments, e.g. for injection molding glass beads or fibers or carbon black and/or silica for tire production, or inserts as in calendering or else during tire production (textile or steel bracing), or other auxiliaries or additives, e.g. plasticizers.

The process parameters may be set in a known manner during the various molding processes. Since the process of the invention does not require any additional step which alters the properties of the material prior to the molding process, it is possible to carry out the molding processes precisely as if no mold-release agent of the invention were added. For example, the pressure at which the material is injected into the injection mold during injection molding is preferably greater than 40 bar, but, like other parameters to be considered during the injection molding process, e.g. temperature, depends on the nature of the polymer used for the injection molding process, and also on the geometry of the injection-molded part. The determination of molding parameters is within the knowledge of the skilled worker, and is not described in further detail here. Information concerning the injection-molding process and other molding processes may be found in Hans Batzer, Polymere Werkstoffe [Polymeric materials], Georg Thieme Verlag Stuttgart—New York, 1984, or in Kunststoff Handbuch [Plastics handbook] 1, Die Kunststoffe; Chemie, Physik, Technologie [Plastics; chemistry, physics, technology], Bodo Carlowitz (Editor), Hanser Verlag, Munich, 1990, for example.

The microparticles present in the mold-release agent used in the process of the invention preferably comprise at least one material selected from silicates, minerals, metal oxides, metal powders, silicas, pigments, and polymers. The mold-release agent used preferably comprises microparticles whose diameter is from 0.02 to 100 µm, particularly preferably from 0.1 to 50 µm, and very particularly preferably from 0.1 to 30 µm. It is also possible to use mold-release agents which comprise microparticles with diameters smaller than 500 nm, or else which comprise microparticles formed by combining primary particles to give agglomerates or aggregates with sizes from 0.2 to 100 µm.

It is preferable to use mold-release agents in which the microparticles present, in particular the particles whose surface has an irregular nanostructure, are particles which comprise at least one compound selected from fumed silica, precipitated silicas, aluminum oxide, mixed oxides, doped silicates, titanium dioxides, and pulverulent polymers. Preferred particles whose surface has an irregular nanostructure have, within this fine structure, elevations which have an aspect ratio greater than 1, particularly preferably greater than 1.5, and very particularly preferably greater than 2.5. The aspect ratio is defined here as the quotient calculated by dividing the maximum height of the elevation by its maximum width.

The microparticles used in the mold-release agent of the invention preferably have hydrophobic properties, which may be attributable to the properties of the actual materials present on the surfaces of the particles, or else may be obtained via treatment of the particles with a suitable compound. The microparticles may be hydrophobicized by treatment with a compound from the group of the alkylsilanes, the fluoroalkylsilanes, and the disilazanes, for example those supplied with the name Dynasylan by Degussa A G.

A more detailed description will now be given of the microparticles preferably present in the mold-release agent used according to the invention. The particles may derive from a variety of sectors, examples being titanium dioxides, doped silicates, minerals, metal oxides, aluminum oxides, silicas, fumed silicates, Aerosil®, and pulverulent polymers, e.g. spray-dried and agglomerated emulsions or cryogenically milled PTFE. Particularly suitable particle systems are hydrophobicized fumed silicas, known as Aerosils. To generate the self-cleaning surfaces, hydrophobic properties are needed alongside the structure. The particles used may themselves be hydrophobic, e.g. PTFE. The particles may have been provided with hydrophobic properties, examples being Aerosil VPR 411® and Aerosil R 8200®. However, they may also be hydrophobicized prior to use as mold-release agent. Examples of these particles to be hydrophobicized prior to use as mold-release agent are Aeroperl 90/30®, Sipernat Kieselsäure 350®, Aluminiumoxid C®, zirconium silicate, vanadium-doped or VP Aeroperl P 25/20®. For the latter, one method of hydrophobicization is treatment with perfluoroalkylsilane compounds, followed by heat-treatment.

The process of the invention gives access to moldings which have any desired shape and which can be produced by one of the molding processes mentioned. These moldings may in particular be vessels for receiving liquids or pastes. These moldings may particularly be selected from vessels, lampshades, buckets, storage vessels, drums, dishes, measuring beakers, funnels, tanks, tires, and housing parts.

The specific embodiment of the process of the invention in which the mold-release agent is pressed into the molding, into one of its surfaces which has not yet solidified, gives access to moldings with a surface which has self-cleaning properties and has surface structures with elevations. Again, these moldings may have any desired shape which can be produced using known molding processes. These moldings may in particular be vessels for receiving liquids or pastes. These moldings may particularly be selected from vessels, lampshades, buckets, storage vessels, drums, dishes, measuring beakers, funnels, tanks, tires, and housing parts.

A feature of moldings produced in this way, with at least one surface which has elevations and has self-cleaning properties, is that the surface has a securely anchored layer of microparticles which form elevations. The elevations present on at least some of the surface of the moldings ensure that these surface regions have low wettability and, with hydrophobic surface properties, therefore have self-cleaning properties.

The moldings e.g. injection moldings with surfaces with self-cleaning properties preferably have elevations with an average height of from 20 nm to 25 µm and with an average separation of from 20 nm to 0.25 µm, preferably with an average height of 50 nm to 10 µm and/or with an average separation of from 50 nm to 10 µm, and very particularly preferably with an average height of from 50 nm to 4 µm and/or with an average separation of form 50 nm to 4 µm. The moldings of the invention very particularly preferably have surfaces with elevations with an average height of from 0.25 to 1 µm and with an average separation of from 0.25 to 1 µm. For the purposes of the present invention, the average separation of the elevations is the separation between the highest elevation of an elevation and the most adjacent highest elevation. If an elevation has the shape of a cone, the tip of the cone is the highest elevation of the elevation. If the elevation is a rectangular parallelipiped, the uppermost surface of the rectangular parallelipiped is the highest elevation of the elevation.

The moldings of the invention have surfaces with self-cleaning properties, and the aspect ratio of the elevations of these is preferably greater than 0.15. The elevations formed by the actual particles preferably has an aspect ratio of from 0.3 to 0.9, particularly preferably from 0.5 to 0.8. The aspect ratio is defined here as the quotient calculated by dividing the maximum height of the structure of the elevations by the maximum width.

Figure 2:
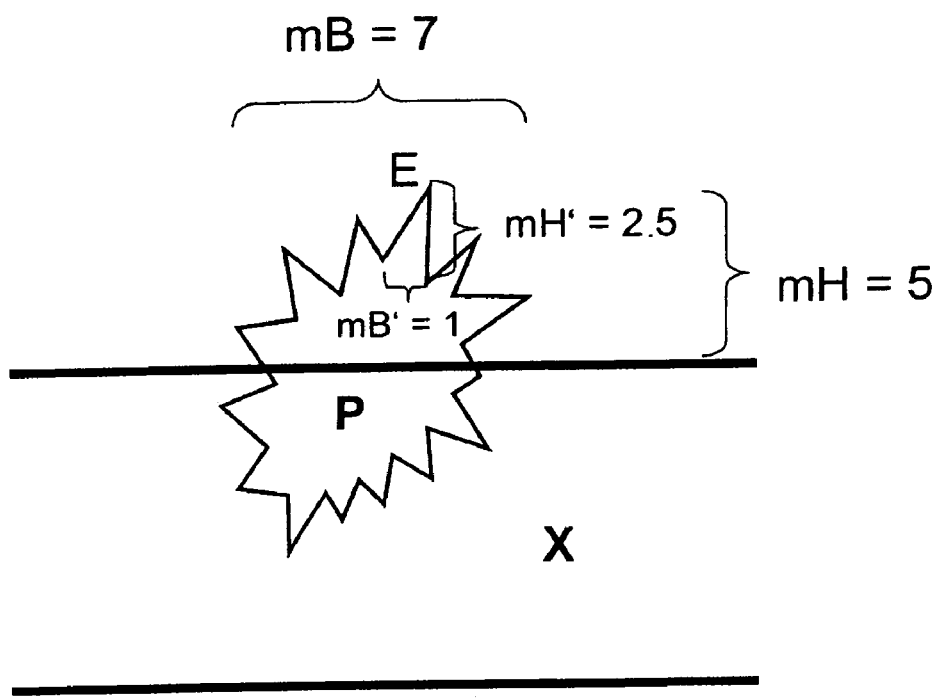
FIG. 2 illustrates a microparticle anchored to the surface of a molding.

FIG. 2 shows diagrammatically the surface of an injection molding X, which comprises anchored particles P (only one particle being depicted in order to simplify presentation). The elevation formed by the actual particle has an aspect ratio of about 0.71, this being the quotient calculated from the maximum height of the particle mH, which is 5, since only that portion of the particle which protrudes from the surface of the injection molding X contributes to the elevation, and the maximum width mB, which in turn is 7. A selected elevation of the elevations E, present on the particles by virtue of their fine structure, has an aspect ratio of 2.5, calculated as the quotient obtained by dividing the maximum height of the elevation mH', which is 2.5, by the maximum width mB', which in turn is 1.

The example below is used to describe the process of the invention, but there is no intention that the invention be restricted to this example.

EXAMPLE

To investigate demolding forces, polyphenylene ether (Vestoran® 1900, Degussa A G) was injection molded, using a Kraus Maffei injection-molding machine. The injection mold is a 34 mm diameter hollow cylinder, around which injection takes place over the length of 34 mm. In each of the experiments the temperature of the cylinder core was from 78.9 to 81.2° C. The pressure needed to press the injection-molded cylinder away from the central cylinder core was determined. Using 5 measurements, it was established that the demolding pressure needed is from 90.0 to 92.6 bar.

The experiments were repeated, but the central cylinder core was now sprayed, according to the invention, with a suspension of 1% Aerosil® R 8200 in ethanol. In each case, injection molding was carried out after evaporation of the solvent. Using 4 measurements, it was found that the pressure needed for demolding assumes values of from 59.4 to 62.8 bar. One value was somewhat higher, at 79.0 bar. The probable reason for this value is that spraying, which was carried out manually around the cylinder in the injection-molding machine, was incomplete.

As can easily be seen from these values, mold-release agents which comprise microparticles, in particular mold-release agents which comprise an ethanolic suspension of Aerosil R8200, can give excellent results.

The invention claimed is:

1. A process for producing moldings by the molding of molding compositions comprising polymeric compounds, comprising:
    applying to a molding tool a mold-release agent comprising microparticles with a size of from 0.02 to 100 µm, wherein the microparticles are selected from the group consisting of metal oxides, metal silicas and mixtures thereof, and have hydrophobic properties, followed by
    molding a molding composition comprising one or more polymeric compounds in the molding tool, wherein the molding is carried out in which the extent to which at least 50% of the microparticles are impressed by the molding tool into a surface of the molding is not more than 90% of their diameter.

2. The process of claim 1, wherein the microparticles have an irregular nanostructure.

3. The process of claim 1, wherein the microparticles are nanostructured microparticles which have a fine structure with elevations with an aspect ratio greater than 1.

4. The process of claim 1, wherein the mold-release agent comprises the microparticles suspended in a liquid.

5. The process of claim 4, wherein the mold-release agent comprises the microparticles suspended in a liquid selected from the group consisting of alcohols, ketones, and ethers.

6. The process of claim 1, wherein the microparticles comprise a metal oxide.

7. The process of claim 1, wherein the microparticles comprise a metal silica.

8. The process of claim 1, wherein the mold-release agent is applied to the molding tool by spraying.

9. The process of claim 8, wherein the mold-release agent is applied to the molding tool by applying, to the molding tool, a suspension which comprises microparticles and a solvent, and then evaporating the solvent.

10. The process of claim 9, wherein the mold-release agent is applied to the molding tool by applying an aerosol which comprises microparticles and a propellant gas.

11. The process of claim 1, wherein the microparticles used, have an average particle diameter of from 0.02 to 100 µm.

12. The process of claim 1, wherein the polymer comprises a member selected from the group consisting of polycarbonates, poly(meth)acrylates, polyamides, polyvinyl chloride, polyethylenes, polypropylenes, aliphatic linear or branched polyalkenes, cyclic polyalkenes, polystyrenes, polyesters, polyether sulfones, polyacrylonitrile, polyalkylene terephthalates, poly(trifluoroethylene), poly(vinylidene fluoride), poly(chlorotrifluoroethylene), poly(hexafluoropropylene), poly(perfluoropropylene oxide), poly (fluoroalkyl acrylate), poly(fluoroalkyl methacrylate), poly(vinyl perfluoroalkyl ether), perfluoroalkoxy compounds, poly(isobutene), poly(4-methyl-1-pentene), polyoxymethylenes, ABS, polyisoprene, polychloroisoprene, synthetic or natural rubber, polynorbornene in the form of homo- or copolymer, and mixtures thereof.

13. The process of claim 1, wherein the molding process is injection molding, calendering, extrusion, sheet extrusion, thermo forming, or blow molding.

14. The process of claim 12, wherein the mold-release agent is applied to the inner surfaces of an injection mold, thermo forming mold, or blow mold during injection molding, thermo forming or blow molding, or to the surface of a molding roll during calendering, extrusion or sheet extrusion.

* * * * *